Dec. 24, 1968     J. L. EVANS ETAL     3,417,474
GYROCOMPASS
Filed Oct. 19, 1965

JOHN L. EVANS
HUGH E. RIORDAN
INVENTORS

BY

*Thomas W. Kennedy*
ATTORNEY

United States Patent Office 3,417,474
Patented Dec. 24, 1968

3,417,474
GYROCOMPASS
John L. Evans, Oakland, and Hugh E. Riordan, Wyckoff, N.J., assignors to General Precision Systems Inc., a corporation of Delaware
Filed Oct. 19, 1965, Ser. No. 498,005
7 Claims. (Cl. 33—72)

ABSTRACT OF THE DISCLOSURE

The inner gimbal or rotor case of a gyrocompass is supported by a squeeze-film universal air bearing formed between its spherically curved under surface and a piezo-electrically vibrated spherically curved annulus. The rotor case carries a liquid ballistic type mechanical damper which it supports below its spherical under surface and in the space surrounded by the bearing annulus, in an effective compact position to increase the pendulosity of the inner gimbal about the center of curvature of the spherical bearing.

---

The present invention relates to a pendulous gyrocompass, and particularly to a pendulous gyrocompass having a squeeze-film support system.

A conventional two-axis pendulous gyrocompass comprises a rotor with a horizontal spin axis, a pendulous gimbal supporting said rotor having a vertical pendulum axis disposed substantially at right angles to said spin axis with a pivot point at an upper end thereof and with a center of gravity point at a lower end thereof, and a multi-gimbal support system including at least two additional gimbals having a vertical azimuth axis intersecting said pendulum axis at said pivot point forming a tilt angle therebetween for tilting said pendulous gimbal and said rotor in any direction and for rotating said pendulous gimbal and said rotor about said azimuth axis.

With such construction of the conventional two-axis pendulous gyrocompass, it is known that the settling time, which is the time period required for the rotor spin axis to point exactly northward within a narrow range of oscillation, is inversely proportional to the length of the pendulous arm of the pendulous gimbal.

One problem with said conventional two-axis pendulous gyrocompass is the difficulty in minimizing the settling time of the gyrocompass without increasing the length of its pendulous gimbal and the size of said gyrocompass.

In accordance with one embodiment of the present invention, the settling time of the gyrocompass is minimized by using a pendulous gimbal with the shape of a spherical sector of one base and having a very long pendulous arm, and by using a squeeze-film support system for supporting said spherically-shaped pendulous gimbal. In this way, the pendulous arm can be increased in length without increasing the size of the gyrocompass.

Accordingly, it is one object of the invention to provide a gyroscope in which the gyro drift error is minimized.

It is another object of the invention to provide a pendulous gyrocompass according to the aforementioned object which has a short settling time.

It is still another object of the invention to provide a pendulous gyrocompass according to the aforementioned objects, in which the ratio of gyrocompass settling time to gyrocompass size is minimized.

It is a further object of the invention to provide a pendulous gyrocompass according to the aforementioned objects for use as a high-accuracy surveying transit.

To the fulfillment of these and other objects, the invention provides a gyrocompass comprising a rotor, a pendulous gimbal, a support gimbal and a squeeze-film bearing means. Said rotor has a spin axis and said pendulous gimbal has a pendulum axis with a pivot point disposed substantially at right angles to said spin axis. Said support gimbal has an azimuth axis intersecting said pendulum axis at said pivot point. Said squeeze-film bearing means is disposed between said pendulous gimbal and said support gimbal for tilting and rotation of said rotor and said pendulous gimbal relative to said support gimbal.

Other objects of the invention will become apparent upon reading the following description. The drawings, which have like parts that are designated by like numerals throughout the several views, include various figures, wherein.

Figures 1, 2:
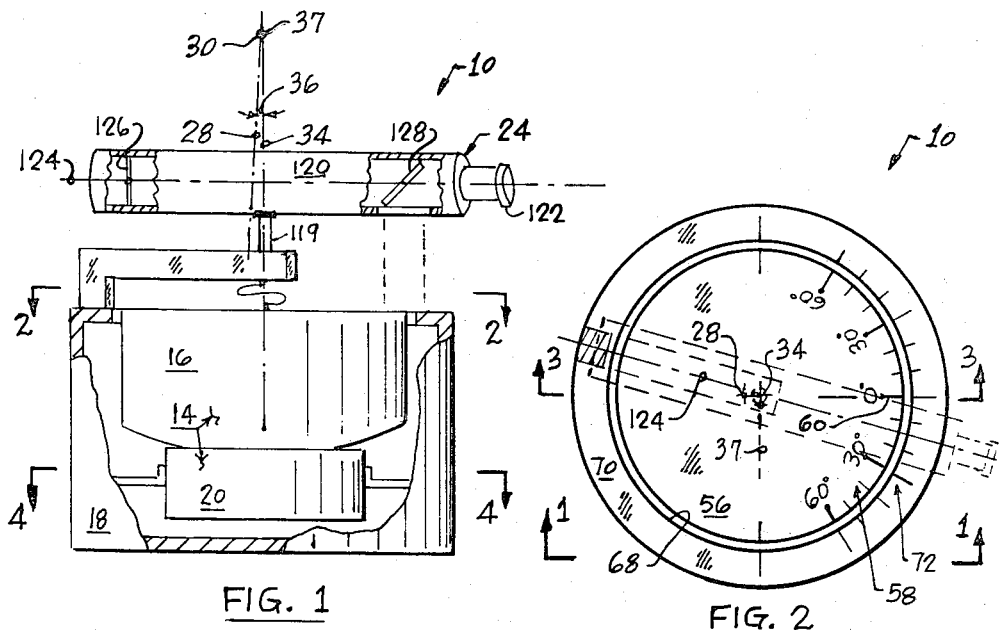
FIG. 1 is an elevation view of a gyrocompass embodying features of the present invention.
FIG. 2 is a sectional view taken along the line 2—2 of FIG. 1.
Figures 3, 4:
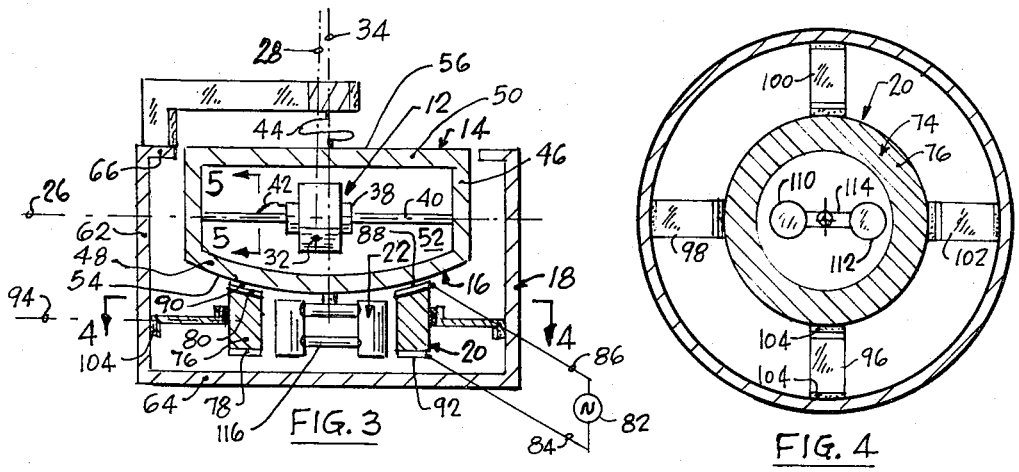
FIG. 3 is a sectional view taken along the line 3—3 of FIG. 2.
FIG. 4 is a sectional view taken along the line 4—4 of FIG. 1.

Referring to FIGS. 1, 2, and 3, there is shown a pendulous gyrocompass 10 comprising a rotor 12 and a support means 14 for tilting of rotor 12 in any direction and for rotating rotor 12.

Support means 14 includes a pendulous inner gimbal 16 for rotatably supporting rotor 12, an outer gimbal 18 for supporting inner gimbal 16, and a squeeze-film bearing means 20, which is disposed therebetween for universal movement of gimbal 16 relative to gimbal 18. As will be described in more detail below, gimbal 16 has a mechanical damper 22, which is fixedly connected thereto; and gimbal 18 has a telescope 24, which is fixedly connected thereto.

Gimbal 16, which is generally in the form of a hollow cylindrical enclosure, includes a peripheral wall 46, a substantially flat upper end wall 50, and a lower end wall 48 in the shape of a spherical segment. Within the cavity 52 formed interior to gimbal 16 is fixedly mounted a shaft 40 upon which is rigidly mounted a motor 38 for driving rotor 12. The spin axis 26 of rotor 12 therefore extends coaxially relative to shaft 40 as shown in FIG. 2. In order to supply power to motor 38, a conductor 42 extends along shaft 40, wall 46, upper end wall 56 to a flex lead 44 which latter is connected to an external electrical supply (not shown). The upper end face 56 of wall 50 has scribed or printed thereon an angle scale 58 in degrees and minutes. Annular scale 58 has its zero-degree line 60 located in a plane normal to upper end face 56 and including shaft 40 and therefore spin axis 26.

The outer spherical face 54 of lower end wall 48 has a center of curvature 30 located on azimuth axis 34 of gimbal 16 which coincides with the central axis of outer gimbal 18. The radius between point 30 and point 32, the centroid point corresponding to the center of gravity of the mass of rotor 12 and gimbal 16, defines the pendulum arm 28 of inner gimbal 16. That is, during its oscillatory period, gimbal 16 will be constrained to move pendulously relative to axis 34 as though it were suspended at point 30, the center of curvature of spherical face 54. To illustrate, suppose an input torque drives inner gimbal slightly to the left as shown in FIG. 3. The gimbal will be observed to tilt about an axis 37 passing through pivot point 30 and which is substantially normal to the plane including axis 26 and pendulum arm 28 as seen in FIGS. 1 and 3 to form a tilt angle 36 relative to azimuth axis 34. Thus, the mass of gimbal 16 and rotor 12 acts at centroid 32 causing a pendulous moment about input axis 37 which, in turn, results in precessive movement of gimbal 16 about the azimuth axis 34.

Using conventional design procedures, gyro 10 is provided with a suitably long pendulous moment for automatically torquing gimbal 16 about axis 34 to thereby counteract the moment of earth's rate and to thereby prevent drifting of axis 26 away from true north. In this way, spin axis 26 remains in the plane of the local earth meridian, pointing at true north.

Outer gimbal 18, which supports gimbal 16, has a peripheral wall 62 and a pair of axially-spaced end walls 64, 66. Wall 66 has a cylindrical opening 68, which is concentric about axis 34. Wall 66 has an axially-outer end face 70 of flat, annular shape, which is substantially coplanar with face 56 when axes 28 and 34 are aligned. Face 70 preferably has an angular scale 72, which is scribed thereon and which corresponds to and complements scale 58 that is adjacent thereto.

Squeeze-film means 20 includes an annular vibrator body 74, which is coaxial with gimbal 18 along axis 34. Vibrator 74, which has a sandwich-type construction, includes an annular axially-inner ceramic core 76, which is preferably composed of a piezo-electric material, such as lead zirconate titanate or such as barium titanate. Vibrator 74 also has an annular lower plate 78 of flat shape and an annular upper plate 80 of spherical shape. Plates 78, 80, which are substantially similar in construction, preferably are metal films, such as electroless nickel films, which are deposited on core 76. Vibrator 74 also includes an AC voltage supply 82 with a pair of leads 84, 86, which are respectively connected to plates 78, 80. Plate 80 has a concave end face 88, which has a spherically-shaped surface with a spherical center coincident with pivot point 30. Face 88 is separated from face 54 by a uniform gap 90 forming a squeeze-film bearing therebetween. Plate 78 has an end face 92. Core 76 has a nodal plane 94, which is disposed substantially at right angles to axis 34 and which is disposed approximately mid-way between faces 88 and 92.

Squeeze-film means 20 also has a plurality of support members 96, 98, 100, 102, which are disposed substantially in nodal plane 94, which are bonded to vibrator 74 at their radially-inner ends, and which are bonded to wall 62 at their radially-outer ends by an adhesive 104, or the like. The friction restraints caused by squeeze-film means 20 are relatively less than those of conventional gimbal support means whereby gyro drift error is minimized.

Figures 5, 6:
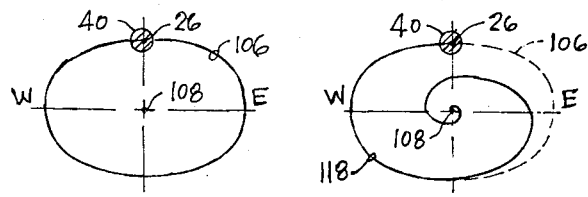
FIG. 5 is a schematic sectional view taken along the line 5—5 of FIG. 3.
FIG. 6 is a schematic sectional view corresponding to FIG. 5.

FIG. 5 illustrates the ellipse-shape travel path 106 of axis 26. Path 106 has a center point 108 about which axis 26 travels. The damping effect of gyrocompass 10, like any pendulous gyrocompass, is inversely proportional to the settling time. Said damping effect varies directly with the speed of travel of axis 26 along path 106, which in turn varies with the square root of the length of the gyro pendulum arm. For example, a four-times longer pendulum arm has a two-times greater damping effect and one-half the settling time. The gyro pendulum arm of gyrocompass 10, which is the length along axis 28 between centroid 32 to pivot point 30, is substantially longer than in a conventional gyrocompass of like size. Thus, with the construction of gyrocompass 10, the settling time is minimized and the ratio of gyrocompass settling time to gyrocompass size is also substantially minimized.

Damper 22, which is disposed below gimbal 16, includes a pair of cylindrical, sealed, evacuated containers 110, 112, that are partly filled with mercury. Damper 22 also includes a support means 114, which is fixedly connected to wall 48, for supporting containers 110, 112 therefrom. Damper 22 also has a passage means 116, which interconnects containers 110, 112 to provide a restricted-type flow therebetween upon tilting of gimbal 16 relative to gimbal 18. With this arrangement of damper 22 which is disposed below gimbal 16, the pendulosity of gimbal 16 is substantialy increased. In this way, gyrocompass settling time is further minimized.

With the type of construction of damper 22, using known design procedures for sizing containers 110, 112 and passage 116, damper 22 provides an additional damping torque in order to further reduce gyrocompass settling time. Said damping torque acts about tilt axis 37 and said damping torque is 90 degree out of phase with the gravity-generated pendulous torque that also acts about axis 37. In this way, gyrocompass settling time is further minimized.

FIG. 6 illustrates the cyclic-shaped travel path 118 of axis 26 due to the above-mentioned out-of-phase effect of damper 22. FIG. 6 illustrates graphically why the gyrocompass settling time is further minimized.

Telescope 24 includes a support means 119, which is fixedly connected to gimbal 18. Telescope 24 includes a barrel 120 with an adjustable eyepiece 122, which is pivotally mounted on support 119 for rotation of barrel 120 relative to gimbal 18 about axis 34. Telescope 24 has an optical lens means (not shown) and has a sighting axis 124 therethrough, which is disposed in a plane substantially at right angles to axis 34. Telescope 24 also has a cross-hair unit 126 for aligning a target with axis 124 and has a reflecting unit 128 for reading angle scales 58, 72. Reflector 128 reflects both the image of cross-hair 126 and the picture of adjacent portions of scales 58, 72, which are in the plane of axis 124 and axis 34. As illustrated in FIG. 2, a view through eyepiece 122 displays an angular reading of about fifteen degrees between adjacent portions of scales 58 and 72. Such angular reading is the angle between true north and axis 124. Obviously, with such construction, gyrocompass 10 is useable as a high-accuracy surveying instrument.

In summary, this invention provides a gyroscope in which gyro drift error is minimized; and provides a gyrocompass, which has a short settling time, in which the ratio of settling time to size is minimized, and which is useable as a surveying instrument.

What is claimed is:

1. A gyrocompass comprising:
   a rotor with a spin axis,
   a pendulous inner gimbal supporting said rotor, said pendulous gimbal including a lower end face having a convex substantially spherical surface,
   an outer gimbal for supporting said pendulous inner gimbal and rotor for universal tilting and rotation relative to an azimuth axis central to said outer gimbal, and
   a squeeze-film bearing means disposed between said pendulous inner gimbal and said outer support gimbal for permitting universal tilting and rotating of said rotor and said pendulous gimbal relative to said azimuth axis,
   said squeeze-film bearing means including an upper end face having a concave substantially-spherical surface oppositely disposed relative to said inner gimbal convex surface in the form of an annular ring for forming a uniform squeeze-film gap between said annular ring and said convex surface,
   said inner gimbal further including mechanical damper means supported below said lower end face and substantially in the center thereof for occupying the inner space of said squeeze-film annular ring bearing means whereby said damper means further increase the pendulosity of said inner gimbal.

2. A gyrocompass as claimed in claim 1, in which said damper includes a pair of evacuated containers partly filled with a liquid and having an interconnecting passage for restricted flow therebetween to further minimize gyrocompass settling time.

3. A gyrocompass as claimed in claim 1, including a telescope fixedly connected to said outer gimbal for use of said gyrocompass as a surveying instrument.

4. A gyrocompass as claimed in claim 3, in which said telescope includes:
- a support means fixedly connected to said outer gimbal,
- an optically-adjustable sighting barrel with a sighting axis pivotally mounted on said support means for rotation about said azimuth axis relative to said support gimbal, and
- means for reading the angle between a plane including said sighting axis and said azimuth axis and a plane including said rotor spin axis and said azimuth axis.

5. A gyrocompass as claimed in claim 1, in which said pendulous gimbal has an upper end face with an angle scale marked thereon having a zero-degree line arranged coplanar with a plane including said spin axis and said azimuth axis.

6. A gyrocompass as claimed in claim 5, in which said outer gimbal has an annular upper end face with a cooperating scale marked thereon disposed adjacent to said pendulous gimbal scale.

7. A gyrocompass comprising:
- a pendulous gimbal with a rotor,
- an outer gimbal, and
- a squeeze-film bearing means disposed between said gimbals,
- said rotor having a motor with a shaft rigidly connected to said inner gimbal, said motor having a conductor including a flex lead portion coupled to said outer gimbal for connecting to an external electrical supply,
- said inner gimbal having a peripheral wall and a pair of spaced end walls forming a cavity, the lower wall having an end face with a substantially spherical surface and the upper wall having an end face with angle scales marked thereon,
- said outer gimbal having a peripheral wall and a pair of end walls, the upper wall having an opening and an end face with a coperating scale thereon disposed adjacent said inner gimbal scale,
- said squeeze-film bearing means being in the shape of an annular ring and including a vibrator body of sandwich construction having a ceramic core, an upper plate and a lower plate with an AC voltage supply having a pair of leads connecting respectively to said plates, the upper plate having a concave end face with a spherical surface separated from said inner gimbal spherical face to form an annular squeeze-film bearing gap,
- said squeeze-film bearing means also including a plurality of support members disposed in a nodal plane around said vibrator body, and
- said gyrocompass also having a mechanical damper and a telescope,
- said damper having a pair of cylindrical sealed and evacuated containers partly filled with a fluid supported from said inner gimbal and a passage means interconnecting said containers having a restricted-type flow therebetween and being disposed within the central space defined by said squeeze-film bearing means annular ring shape for further increasing the pendulosity of said inner gimbal, and
- said telescope including a support means connecting to said outer gimbal, a barrel with an adjustable eyepiece pivotally mounted on said support, the barrel having a sighting axis disposed substantially at right angles to an azimuth axis coincident with the axis of said ring, a cross-hair unit, and a reflecting unit for reading a portion of said adjacent scales on said inner gimbal and said outer gimbal.

References Cited
UNITED STATES PATENTS

| | | | |
|---|---|---|---|
| 1,671,583 | 5/1928 | Henderson | 33—226 |
| 1,793,142 | 2/1931 | Thompson | 33—226 |
| 2,263,232 | 11/1941 | Bolster | 33—226 |
| 2,966,744 | 1/1961 | Mueller | 33—72 |
| 3,001,290 | 9/1961 | Rellensmann et al. | 33—72 |
| 3,018,142 | 1/1962 | Warnock | 308—9 |
| 3,171,696 | 3/1965 | Houghton | 308—1 |
| 3,239,283 | 3/1966 | Broeze | 308—9 |
| 3,339,421 | 9/1967 | Warnock | 74—5 |

FOREIGN PATENTS

| | | |
|---|---|---|
| 842,272 | 12/1952 | Germany. |
| 1,024 | 1/1911 | Great Britain. |

ROBERT B. HULL, *Primary Examiner.*

U.S. Cl. X.R.

33—226; 74—5.5